P. FLOUSSFISCH.
TIME CONTROLLED FARE INDICATOR.
APPLICATION FILED JAN. 25, 1916.

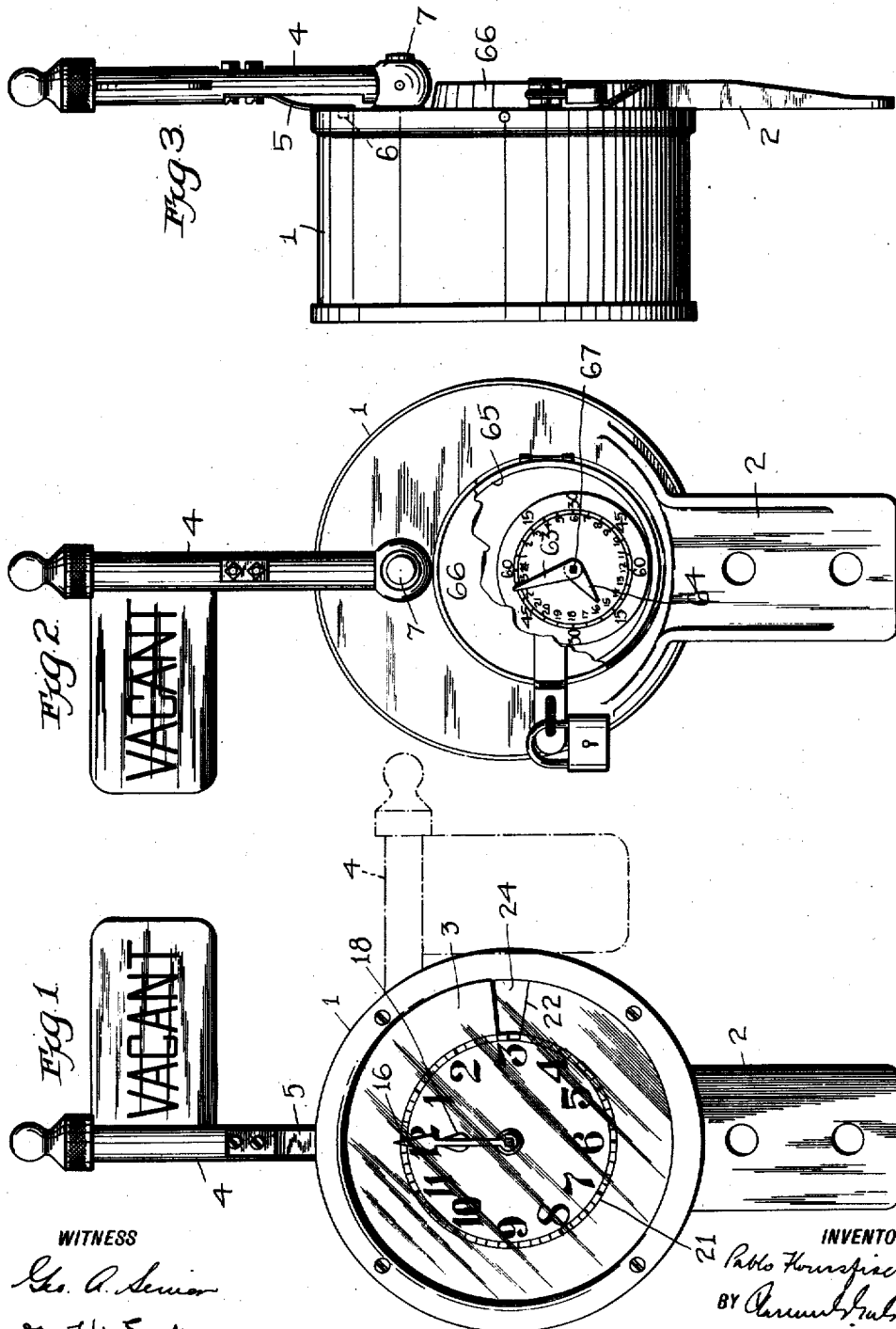

1,239,095.

Patented Sept. 4, 1917.
5 SHEETS—SHEET 2.

WITNESS

INVENTOR
Pablo Floussfisch
BY
ATTORNEY

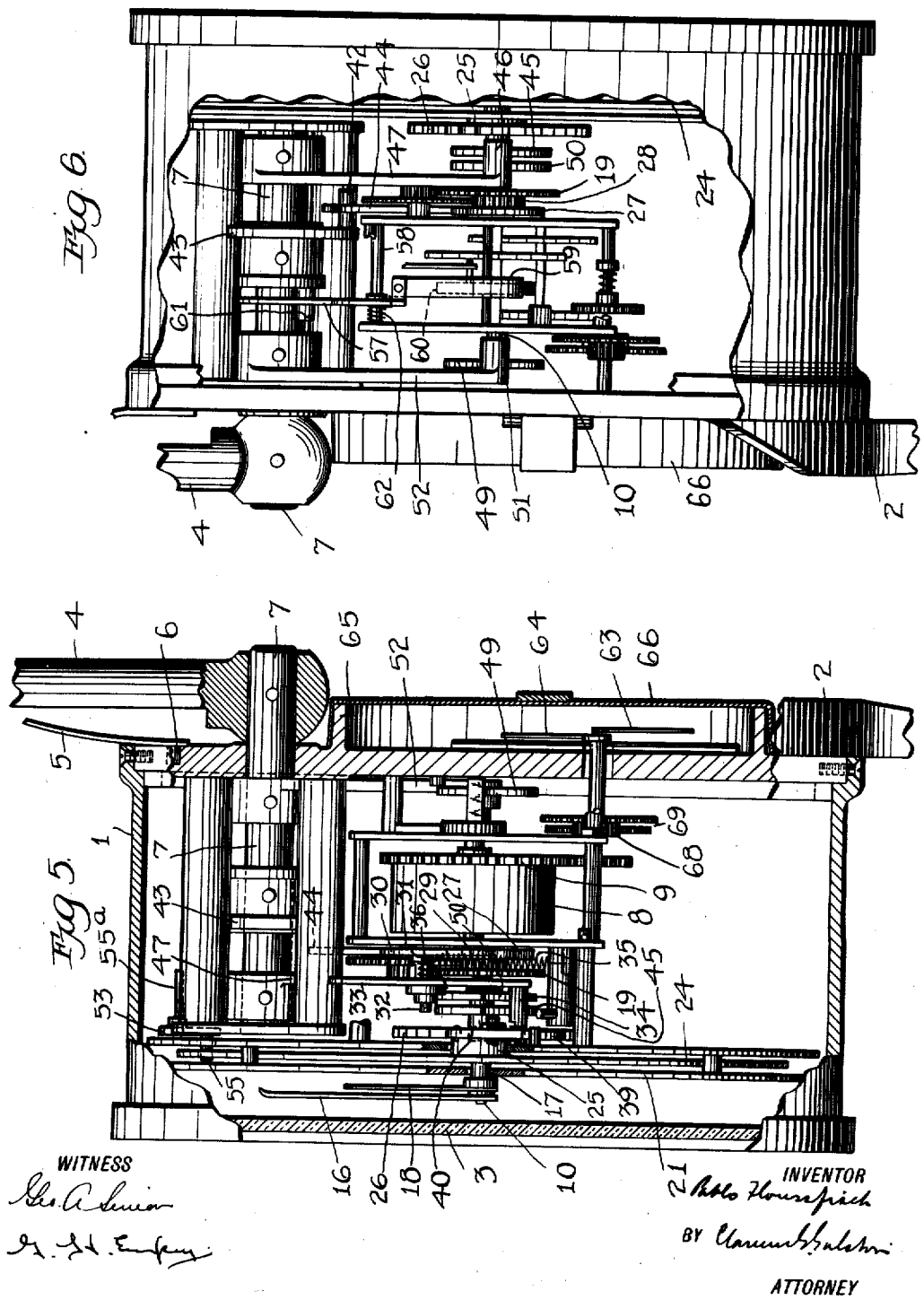

P. FLOUSSFISCH.
TIME CONTROLLED FARE INDICATOR.
APPLICATION FILED JAN. 25, 1916.

1,239,095.

Patented Sept. 4, 1917.
5 SHEETS—SHEET 4.

WITNESS

INVENTOR
Pablo Floussfisch
BY
ATTORNEY

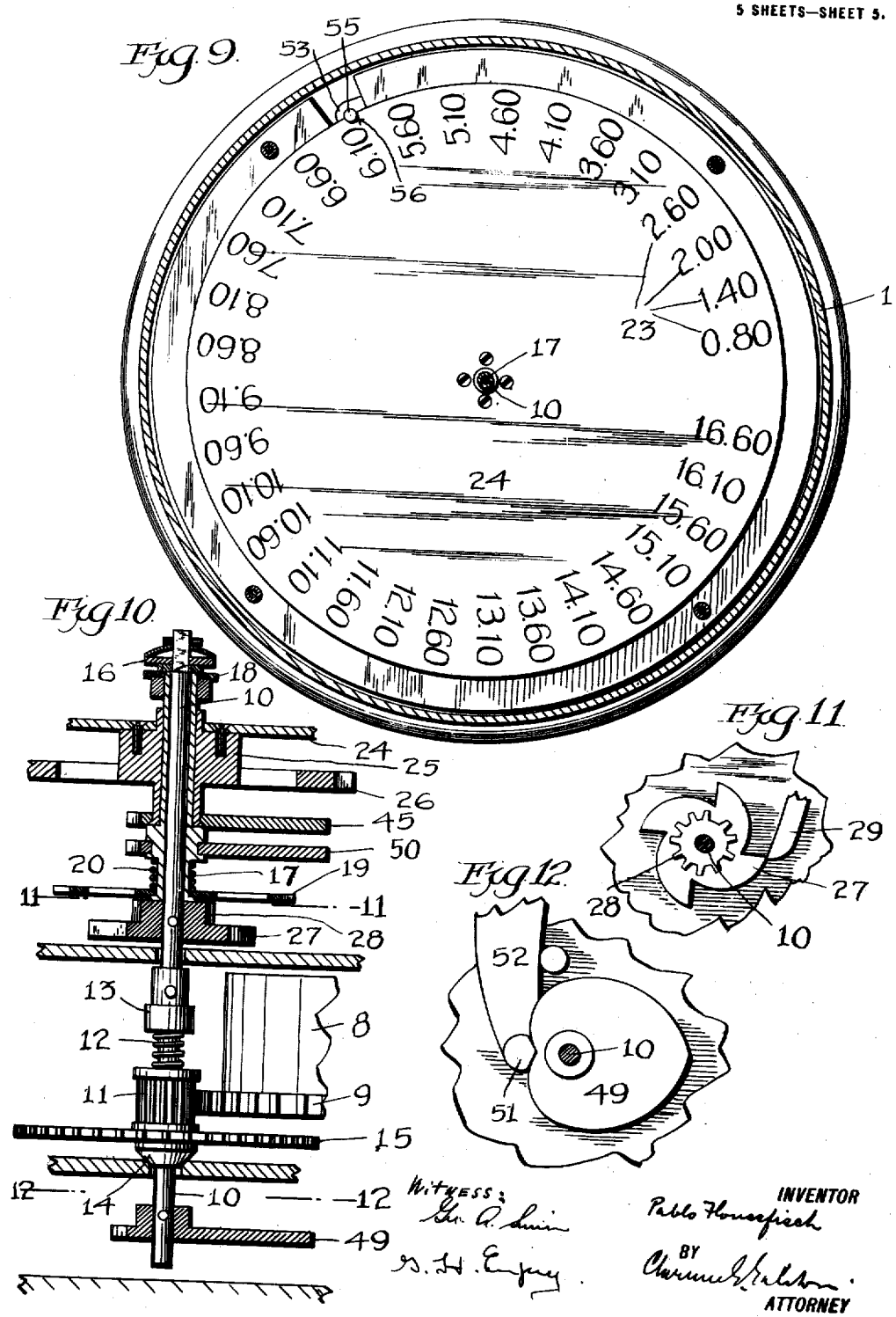

UNITED STATES PATENT OFFICE.

PABLO FLOUSSFISCH, OF NEW YORK, N. Y.

TIME-CONTROLLED FARE-INDICATOR.

1,239,095.        Specification of Letters Patent.        Patented Sept. 4, 1917.

Application filed January 25, 1916. Serial No. 74,081.

*To all whom it may concern:*

Be it known that I, PABLO FLOUSSFISCH, a citizen of Argentina, and a resident of the city of New York, county of New York, and State of New York, have invented certain new and useful Improvements in Time-Controlled Fare-Indicators, of which the following is a specification.

The invention comprises certain new and useful features of construction and operation in time mechanisms, and more particularly in time-controlled fare indicators for public vehicles. The special object of the invention is to provide simple and reliable instrumentalities in a fare indicator of this description whereby the starting and stopping of the clock train and the restoration of an intermittingly operated fare-indicating member and of the clock hands are controlled by a signal member serving as a handle. A further object is to provide such a device with a set of hands, constituting a total time indicator, which are unaffected by such restoring operation. One of the features of the invention resides in the means for intermittingly advancing the fare-indicating member and for disengaging the said means preparatory to the restoration of said member. Other features relate to the manner of coördinating the various instrumentalities which act when the device is stopped or started. Various other objects and aspects of the invention will become apparent to those skilled in the art as the specification proceeds.

In the accompanying drawings:

Figure 1 is a front elevation of the device in inoperative condition, dotted lines representing the signal in the position to which it is moved to start the apparatus in action;

Fig. 2 is a rear elevation with a cover part broken away;

Fig. 3 is a side elevation;

Fig. 5 is a side elevation of the mechanism in the interior, certain parts being shown broken away and in section;

Fig. 6 is a similar view looking from the opposite side;

Fig. 9 is a vertical section through the forward part of the case, showing the fare-indicating member in face view;

Fig. 10 is a horizontal section taken in the plane of the main hour arbor, this arbor and certain other parts being shown in plan;

Fig. 11 is a section on the line 11—11 of Fig. 10; and

Fig. 12 is a section on the line 12—12 of Fig. 10.

Figure 4:
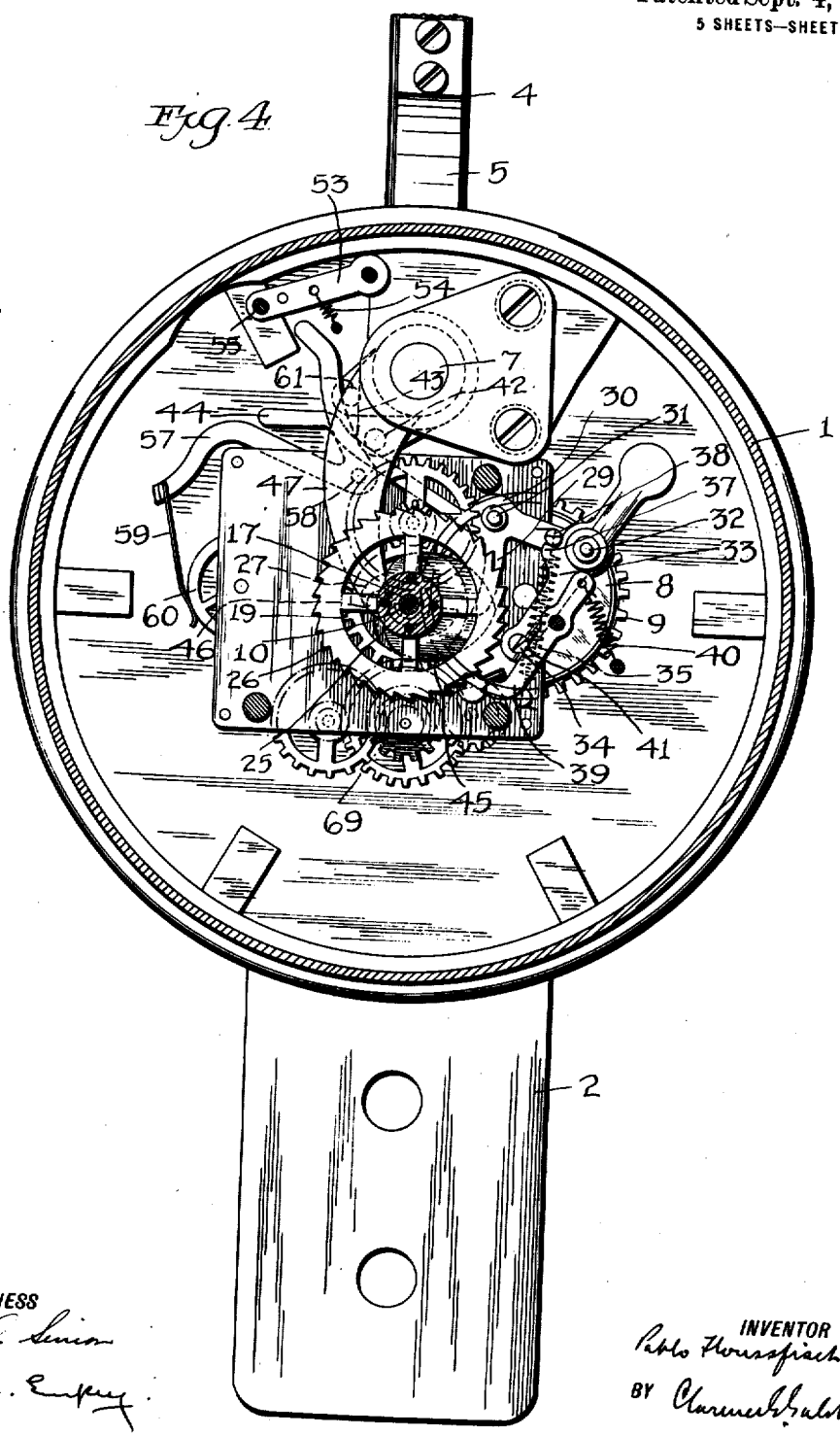
Fig. 4 is an enlarged sectional front elevation, with the front of the case and the dials removed.

The clock train and thereby operated and controlled parts are inclosed in a suitable circular case 1, having a bracket 2 for attachment to the vehicle, and a glass front 3.

A signal arm 4 is mounted at the upper part of the back of the case in such manner as to be capable of being swung from a vertical position to a horizontal position and vice-versa. When the signal arm is vertical, displaying its "vacant" sign, the mechanism in the case is at rest. When it is moved to the horizontal position the mechanism is set in operation, to be arrested when the signal arm is returned to vertical. The said arm is held in its vertical position by a spring latch 5 attached to it and having a pin 6 to enter a hole in the back of the case.

The signal arm is pinned to a rock-shaft 7, extending within the case and supported in suitable bearings. The signal arm and rock-shaft constitute an embodiment of controlling device, which, through suitable connections hereinafter described, coördinates various functions of the machine.

Within the case is housed a conventional or suitable form of clock train, of which the driving spring and primary driving gear are designated 8 and 9 respectively. Various elements of this train appear in different views, but no attempt has been made to show the complete train, since to do so would unduly obscure the drawings without illustrating anything not familiar to the art.

The driving gear 9 drives the minute hand arbor 10 through a pinion 11, which would be loose on the arbor except that it is coupled yieldingly therewith through a compression spring 12, which is interposed between the pinion 11 and a collar 13, so as to press the face of a gear 15 united with the pinion 11 against another collar 14 on the arbor. The function of the gear 15 is immaterial to the invention, being merely a member of the clock train. The spring 12 thus affords a means of disconnection between the minute hand 16 and the clock train, to permit the hand to be restored to initial position as hereinafter described.

In like manner the tubular arbor 17 of the hour hand 18 is yieldingly connected with its immediate driving gear 19 of the clock train, through a spring 20.

The said hour and minute hands coöperate with a usual stationary dial 21, provided at one side however with a window 22, through which the fare indications 23 of a fare-indicating disk or member 24 are visible, one at a time.

This fare-indicating disk is fastened to a hub 25, which has a ratchet wheel 26 united therewith, the hub being mounted to turn on the hour arbor 17. The means for advancing the fare-indicating member intermittingly, in this instance a distance of one division (or indication) every fifteen minutes, will now be described.

Pinned on the minute arbor 10 is a four-toothed tripping wheel 27, the teeth of which are curved or inclined at their advancing sides and perpendicular at the back. The pinion 28 shown united with this tripping wheel merely constitutes an element of the clock train, having no novel function as far as this invention is concerned.

The teeth of the tripping wheel act upon an arm 29 projecting from a feed dog carrier 30, which is pivoted at 31. To this carrier is pivoted at 32 a feed dog 33 having a pin 34 which engages the teeth of the ratchet wheel 26 to advance the same. A spring 35 connected to the carrier constantly tends to urge the same in the direction to cause its dog to advance the ratchet wheel and, therefore, the fare-indicating member 24. Another spring 36 acts upon the feed dog to hold its working element 34 in engagement with the ratchet wheel during the operation of the carrier and dog. The extent to which the dog can swing on the carrier toward the ratchet is limited, however, by the abutment of a shoulder 37 on the dog with a stud 38 on the carrier, from which it results that when the carrier is swung to the inoperative position shown in Fig. 4, its dog is disengaged from the ratchet.

A holding dog 39 pivoted on a suitable frame part is urged into engagement with the ratchet wheel by a spring 40 and serves to hold the ratchet against being dragged backward by the feed dog when the latter is retracted through the action of the forward, inclined side of each of the teeth of the tripping wheel 27 on the arm 29 of the feed dog carrier.

When the feed dog carrier and feed dog are swung to their inoperative positions, the back of the pin 34 on the feed dog presses outward against the holding dog at the region designated 41. In this way means are provided for disengaging the holding dog as well as the feed dog from the ratchet wheel.

Such removal of the dogs is effected by means of a pin 42 on a short arm 43 on the rock-shaft 7, which pin is arranged to bear against and displace a long arm 44 on the feed dog carrier, when the signal arm 4 is swung from the horizontal to the vertical position.

This disengagement of the feed and holding dogs from the ratchet wheel of the fare-indicating member 24 is performed preparatory to restoring the said member to initial position, wherein, preferably, no fare indication appears through the window 22.

Figure 7:
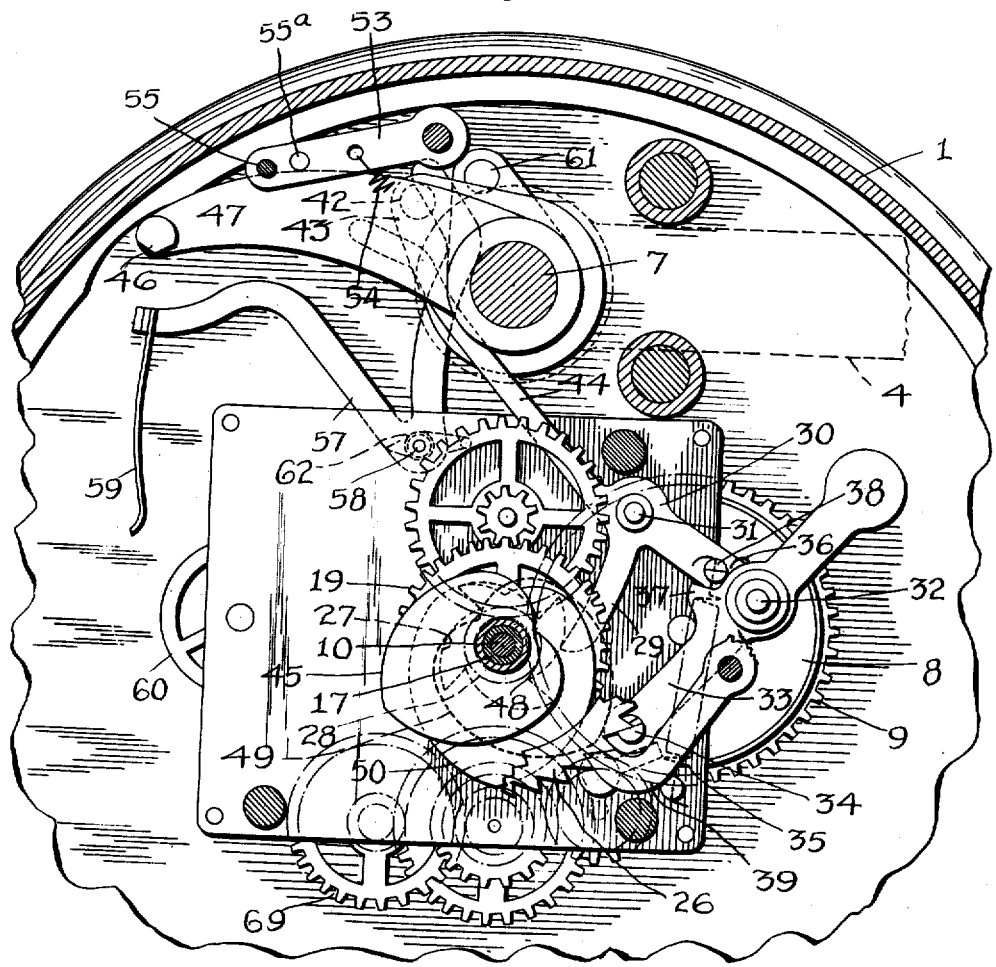
Fig. 7 is a fragmentary view corresponding to Fig. 4, on a still larger scale, showing the parts in a different condition, and with certain parts broken away or omitted.

The restoration or re-setting of the fare-indicating member is controlled by the same rock-shaft 7. To this end a heart-shaped cam 45 is united with the hub 25, for engagement by the angled nose 46 on an arm 47 projecting from the rock-shaft. When the signal arm is horizontal and the machine running, the said nose is removed from the cam, as shown in Fig. 7, but when the signal arm is put up the nose descends and bears forcibly upon the edge of the cam. Then, by reason of the heart-shaped formation, at whatever point the nose strikes the cam the latter is turned in one direction or the other until the nose rests in the notch 48. The cam is so set in relation to the indications on the face of the fare-indicating member that when the nose fits full in the notch the fare-indicating member is in initial position.

Similar means serve to restore the hour and minute hands 18 and 16 to initial position, that is to say, the twelve o'clock position. For this purpose heart-shaped cams 49 and 50 are fastened on the minute and hour arbors. The hour cam 50 is placed alongside the cam 45 and being of the same size may be operated by the same nose 46 of the same arm 47. The cam 49 of the minute arbor is engaged by the nose 51 of a special arm 52 (see Fig. 12) also carried by the rock-shaft 7.

When the fare-indicating member is re-set it is held stationary by a detent comprising a pivoted arm 53 urged by a spring 54 and having a pin 55 arranged to drop into a notch 56 in the periphery of the rotatable disk. When the signal arm is swung down to start the mechanism, this detent is disengaged by the arm 47 which strikes and raises another pin 55ª on the arm 53.

The starting and stopping of the clock train is effected through a bell-crank lever 57, pivoted at 58 and carrying on one of its arms a spring finger 59 to contact with the periphery of the balance wheel 60 of the clock train. When this finger is moved down in the drawings it bears gently against the balance wheel and thereby stops the clock. When it is raised, it gives the balance wheel a partial revolution, so as to insure the clock starting. The movement of the starting and stopping device is caused by the rock-shaft 7, through a pin 61 which is arranged to bear against the other arm of the bell-crank so as to lower the spring finger when the signal arm is raised. When the signal arm is lowered the starting and stopping device is moved free of the balance wheel by a spring 62.

Figure 8:
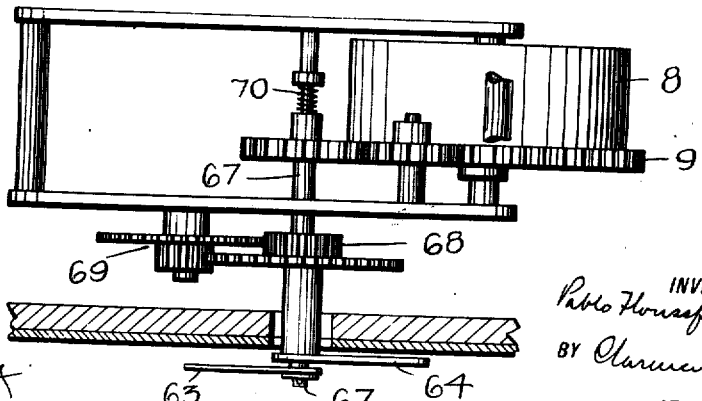
Fig. 8 is a horizontal sectional view showing the total time indicator hands and their driving connections.

In addition to the regular hour and minute hands, a second set of hands 63 and 64 is provided within a back case 65 having a door 66. Of these, the minute hand 63 is mounted on an arbor 67, which is driven by gears 9 and 68, and, therefore, revolves once an hour. The hour hand 64, however, is driven through the reducing train 69, shown in Fig. 8, so that it makes a revolution only once in twenty-four hours. These hands constitute a total time indicator which shows the sum of the several periods during which the machine has been in operation for the space of a day. They are unaffected by the automatic restoration of the hands 16 and 18 to the twelve o'clock position, but may themselves be independently set to zero, at the end of the day, a spring 70 (Fig. 8) being provided to permit of this.

The operation will now be briefly described. With the controlling device in one position, that is to say, with the signal arm erect as in Figs. 1 to 3, the clock mechanism is at rest, the fare-indicating member is held stationary by its detent, and the feed and holding dogs are held out of engagement with the ratchet wheel connected with said member. When the signal arm is swung downward to horizontal position, shown in dotted lines in Fig. 1, the rock-shaft 7 united with this arm performs several functions. In the first place it permits the clock stopping and starting bell-crank to rise under the action of its spring, whereby the spring finger 59 is withdrawn from the balance wheel and in doing so starts the latter in motion, thereby insuring the operation of the clock. It also swings the noses 46 and 51 of the arms 47 and 52 away from the heart-shaped cams, so that the fare-indicating member and the main hour and minute hands are free to be driven. The detent 53 is also disengaged from the fare-indicating member by the arm 47. The feed dog carrier is also permitted to rock under the action of its spring to bring its feed dog into engagement with the ratchet wheel. This in turn permits the holding dog to engage with the said wheel. The tripping wheel 27 being set in motion as soon as the clock train is started commences to travel beneath the arm 29 of the feed dog carrier. The parts are preferably so adjusted that at each stopping of the clock mechanism and resetting of the fare-indicating member the said arm 29 bears upon the extremity of one of the teeth of the tripping wheel, so that practically as soon as this wheel starts to turn the arm drops off the said extremity behind the perpendicular rear face of the tooth, thereby permitting the spring-urged feed dog carrier to advance the ratchet wheel and the therewith connected fare-indicating member the distance of one division. This causes the first fare indication to appear in the window 22, thereby indicating the charge for the first quarter-hour. Thereafter, as the tripping wheel continues to revolve the arm 29 of the feed dog carrier rides upon the inclined forward side of the succeeding tooth, with the result that the feed dog is gradually retracted along the periphery of the ratchet wheel in readiness to advance the same another division as soon as the said arm drops off the extremity of this tooth. This occurs at the expiration of fifteen minutes, and the same operation is repeated at equal intervals as long as the clock continues to run and until the signal-arm controlling device is again set to the inoperative or "vacant" position. When the signal arm is moved to such position, the rock-shaft swings the bell-crank 57 downward so that its spring finger presses against the balance wheel, thereby stopping the clock. The rock-shaft also acts upon the feed dog carrier in the manner heretofore described, so as to disengage the feed dog from the ratchet wheel, the same operation also disengaging the holding dog. The noses of the arms 47 and 52 are now forced against the edges of the heart-shaped cams, which are rotated in one direction or the other until the said noses are seated in their notches. In this way the fare-indicating member and the main hour and minute hands are restored to the initial positions represented by Figs. 1 and 9. When the fare-indicating member is so re-set, its detent automatically engages with it to prevent any possibility of accidental displacement.

The second set of hands 62 and 63 within the back case are driven whenever the clock is in motion, but are not restored with the restoration of the main set of hands and of the fare-indicating member. They consequently show at the end of each day the total time during which the machine was in operation. These ends may be set to zero manually when desired.

What I claim as new is:

1. In an apparatus of the character described, the combination of driving mechanism, a rotary registering member, a ratchet wheel united with said registering member, a tripping cam driven by the driving mechanism and mounted coaxially with the registering member and its ratchet wheel, a bell crank feed dog carrier having one arm extending into operative relation to said tripping cam, a feed dog pivoted upon its other arm in operative relation to the ratchet wheel united with the registering member, a resetting cam connected with the registering member, a rock member bearing an arm to act upon said resetting cam, and an extra arm united with said bell crank feed dog carrier and extending into position to be likewise operated by said rock member.

2. In an apparatus of the character described, the combination of clock mechanism, clock hands driven thereby through friction connections, a registering disk coaxial with the clock hands, means operated by the clock mechanism for intermittingly advancing the registering disk, a ratchet wheel united with the registering disk, a tripping cam coaxial with the hands, disk and ratchet wheel and driven by the clock mechanism, feed mechanism operated by said tripping cam and acting upon said ratchet wheel, resetting cams united with the coaxial hands and registering disk, and means for simultaneously acting upon said resetting cams.

In witness whereof, I have hereunto set my hand this 18th day of January, 1916.

PABLO FLOUSSFISCH.

Witnesses:
G. H. CASPEY,
TEKLA A. ANDERSON.